United States Patent [19]

Ogden

[11] Patent Number: 4,571,128
[45] Date of Patent: Feb. 18, 1986

[54] I. D. HELIX GROOVING HEAD

[75] Inventor: Charles A. Ogden, Houston, Tex.

[73] Assignee: Smith International, Inc., Newport Beach, Calif.

[21] Appl. No.: 372,502

[22] Filed: Apr. 28, 1982

[51] Int. Cl.⁴ .............................................. B23B 35/00
[52] U.S. Cl. ..................................... 408/1 R; 408/224
[58] Field of Search ....................... 408/36, 59, 81, 82, 408/83, 181, 182, 184, 185, 200, 222, 223; 409/65, 67, 70, 73, 75, 76, 77, 78, 260, 261, 306, 307; 82/DIG. 3, 36 R, 5, 1 C, 1.4, 2 E; 10/98, 140, 142, 101 R; 407/67, 68, 69, 70

[56] References Cited

U.S. PATENT DOCUMENTS

| 1,643,264 | 9/1927 | Wetmore | 408/152 |
|---|---|---|---|
| 2,212,753 | 8/1940 | Smila et al. | 408/224 X |
| 2,407,921 | 9/1946 | Deliso | 407/12 |
| 2,821,874 | 2/1958 | Oliver | 408/181 |
| 2,954,520 | 10/1960 | Couch | 407/70 X |
| 4,093,392 | 6/1978 | Hopkins | 407/51 X |
| 4,184,794 | 1/1980 | Henninghans | 408/83 X |

FOREIGN PATENT DOCUMENTS

| 2245139 | 3/1973 | Fed. Rep. of Germany | 408/224 |
|---|---|---|---|
| 2391802 | 1/1979 | France | 10/101 R |
| 968745 | 9/1961 | United Kingdom | 408/223 |

Primary Examiner—Gil Weidenfeld
Assistant Examiner—Glenn L. Webb
Attorney, Agent, or Firm—Murray Robinson; Ned L. Conley; David A. Rose

[57] ABSTRACT

A grooving head for cutting an internal helical groove is mounted at one end of a tubular boring bar. The head has two cutter sockets that are axially spaced apart and are azimuthally spaced apart 180 degrees. Cutters are disposed in the sockets and means are provided to adjust the radial distance to which the cutters extend from the axis of the bar and head, the trailing cutter extending farther than the leading cutter. The bar is stabilized by a plurality of wear buttons at its outer periphery, the buttons having convex outer ends and being azimuthally spaced apart and radially adjustably positioned.

4 Claims, 21 Drawing Figures

I. D. HELIX GROOVING HEAD

SUMMARY OF THE INVENTION

This invention relates to a head or cutter mount to be secured to the end of a boring bar and more particularly to such a head adapted for cutting a helical groove on the interior of a tube. The head is particularly useful for forming the inner periphery of a helical bellows spring for a vibration damper of the type disclosed in U.S. Pat. No. 3,447,340-Garrett.

Heretofore there has been employed a tool comprising a single point (cutter) cantilevered in a generally cylindrical head, with four large wear pads on the head to contact the inner periphery of the work piece so as to maintain concentricity. The wear pads add considerable drag and friction and lower the cross sectional strength of the grooving head. Despite the wear pads, the single point tool chatters when in use, which reduces the quality of the finish. All of the foregoing limit the size, i.e. depth and width or cross sectional area, of the helix groove which may be cut.

According to the invention, there is provided a grooving head having two points (cutters) which are positioned to cut at different depths in diametrically opposed portions of a helical groove. In other words, they are azimuthally, i.e. circumferentially, separated by 180 degrees with respect to the axis of relative rotation of the work and the head, and they are axially separated by the one half of the lead of the helix, and the trailing cutter extends radially from the axis farther than the leading cutter. The opposed cutters balance the load on the head, thereby preventing chatter. This eliminates the need for wear pads on the head, thereby increasing its strength. More particularly, a better groove finish is obtained. The size of the helix groove is limited only by machine tool availability, i.e. the power of the machine. Preferably three equiazimuthally spaced apart, convex (concial), adjustable position wear buttons are provided on the boring bar that holds the head, to stabilize the distal end of the boring bar. However, these buttons create very little frictional drag, since there is very little radial load on the wear buttons in the subject balanced cutter construction compared to the radial load on the wear pads of the previously employed single point tool. Due to the simultaneous employment of two cutters, the total material removed on each pass of the tooling is nearly doubled, and due to the elimination of chatter, groove cuts by each cutter can be held to a tolerance of as little as 0.0001 inch even with deep wide cuts, whereby grooves may be cut more quickly, resulting in reduced labor cost and an improved product. A synergistic effect is obtained since the elimination of chatter allows each cutter to cut away more material per tool pass and also permits the employment of plural cutters which further increases the amount of material removed with each pass of the tool, whereas the employment of plural balanced cutters is that which eliminates chatter.

BRIEF DESCRIPTION OF THE DRAWINGS

For a detailed description of a preferred embodiment of the invention and certain prior art, reference will now be made to the accompanying drawings wherein.

The drawings are to scale and a few dimensions are specified to indicate the scale. The conventions of the United States Patent and Trademark Office for patent cases have been used to indicate materials, from which it will be seen that the parts are preferably all made of metal, e.g. steel.

DEVELOPMENT HISTORY

The prior art single cutter grooving head referred to above is shown in FIGS. 1 through 5. A plain boring bar, according to the prior art, having no wear buttons, and adapted to receive the prior art single cutter grooving head is shown in FIG. 6. The subject multiple point grooving head invention was disclosed to applicant's supervisor, Jim Richardson, in 1979. A sketch of a tool according to the invention was made in July 1979 and given to Larry Lacy, a designer, with verbal instructions, to make first drawings. The first prototype model was started in September 1979 and finished in October 1979. First cutting test was run in November 1979 and full production tests occurred in May 1981. The resultant product passed full Q. A. Inspection. The invention was docketed by patent department of applicant's employer under date of June 22, 1981.

Figures 14, 15, 16:
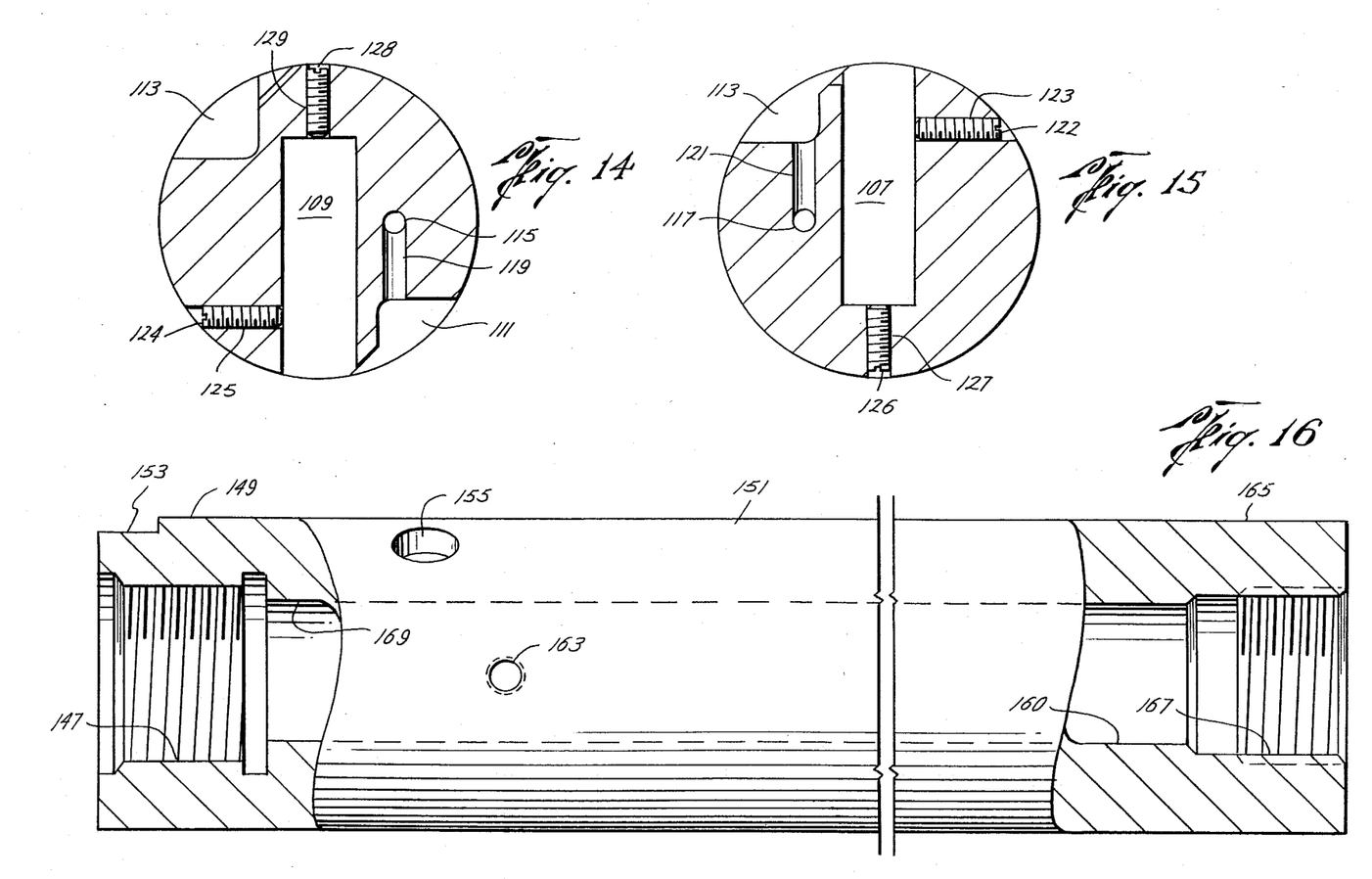
FIGS. 14 and 15 are sections taken at planes 14—14 and 15—15 indicated in FIGS. 12 and 13.
FIG. 16 is a side view, partially in section, showing a boring bar in accordance with the invention.
Figure 17:
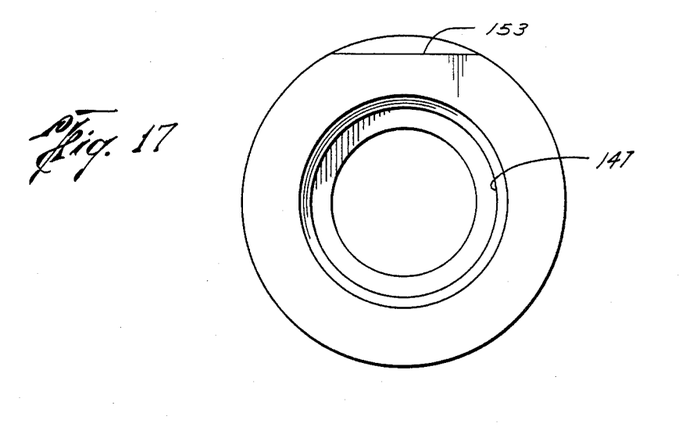
FIG. 17 is a left end view of the bar shown in FIG. 16.

An initial review of the invention referenced pages 1327-1332 of the 1956 edition of Machinery's Handbook, which illustrates a number of boring bar constructions. FIGS. 1, 3, 5, 6, 7, 9, 10, 16, 18, 22, 24 and the cutters on pages 1328 and 1329 appear to show two ended cutters or two cutters per head, but the cutters are coplanar. FIG. 16 shows a head having two cutters disposed in open sided slots and held by lateral set screws and adjusted by side engaging screws. FIG. 17 shows a head having four coplanar cutters set in closed sided slots and held by lateral set screws and adjusted by axial set screws; there are no coolant passages or cut outs for the coolant exit ports.

A patent search relative to the subject construction referenced the following U.S. patents:

2,551,948—Hutchinson
2,821,874—Oliver
3,198,037—Yogus
3,625,624—Fitzsimmons
3,795,454—Eichyshya
4,039,295—Hochmuth
4,072,438—Powers
4,063,841—Niman
4,131,383—Powers
4,168,925—Dufresne
4,220,429—Powers The Oliver patent shows tooling for cutting an internal annular groove, including a boring bar with a positioning sleeve journaled on the end thereof adjacent the cutter mount, but only a single cutter is employed.

None of the above patents appears to disclose two axially and azimuthally spaced cutters for cutting an internal helical groove.

DESCRIPTION OF SINGLE POINT GROOVING HEAD (PRIOR ART)

Before describing in detail a preferred embodiment of the invention, the prior art single cutter apparatus previously employed will be briefly described.

Figure 1:
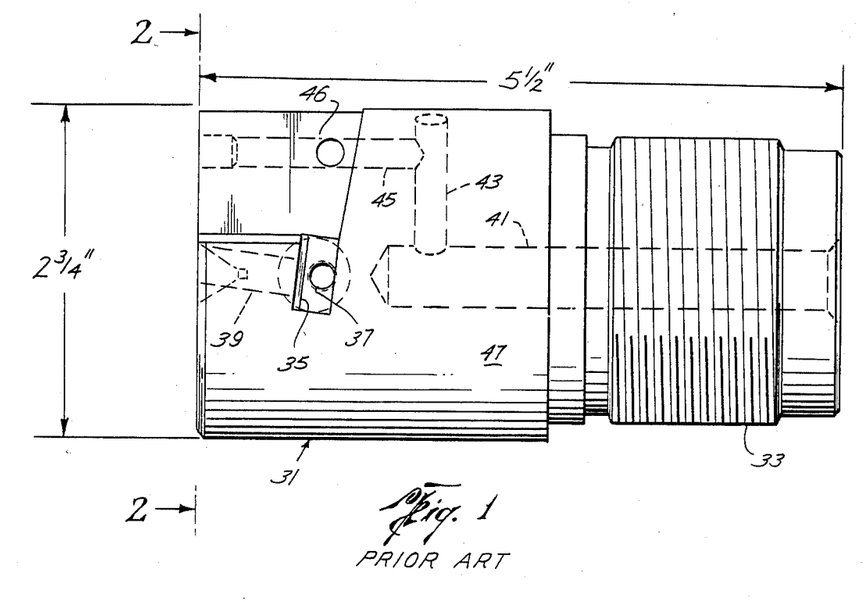
FIG. 1 is a side view of a prior art grooving head or cutter mount.
Figure 2:
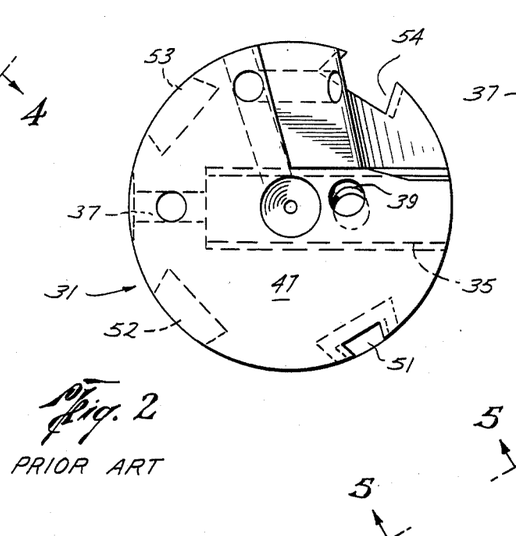
FIG. 2 is a section through the head shown in FIG. 1, taken at phone 2—2 indicated in FIG. 1.
Figure 3:
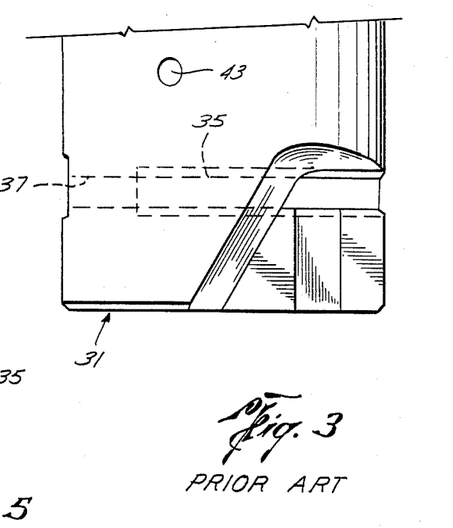
FIG. 3 is a top view of the head shown in FIG. 1.

Referring to FIGS. 1 to 3 there is shown a grooving head or cutter mount 31 which is of generally cylindrical configuration. One end 33 of the head is externally threaded so that it can be screwed into the end of a boring bar. A single socket 35 is adapted to receive a single cutter (not shown). A threaded hole 37 in the bottom of the socket is adapted to receive a screw for adjusting the protuberance of the cutter from the socket. A threaded hole 39 is adapted to receive a set screw for holding the cutter in the socket. Fluid passages 41, 43, 45 are provided to conduct coolant liquid to the cutter from the boring bar, the passage terminating at sector shaped recess 46 adjacent the socket.

Figures 4, 5, 6:
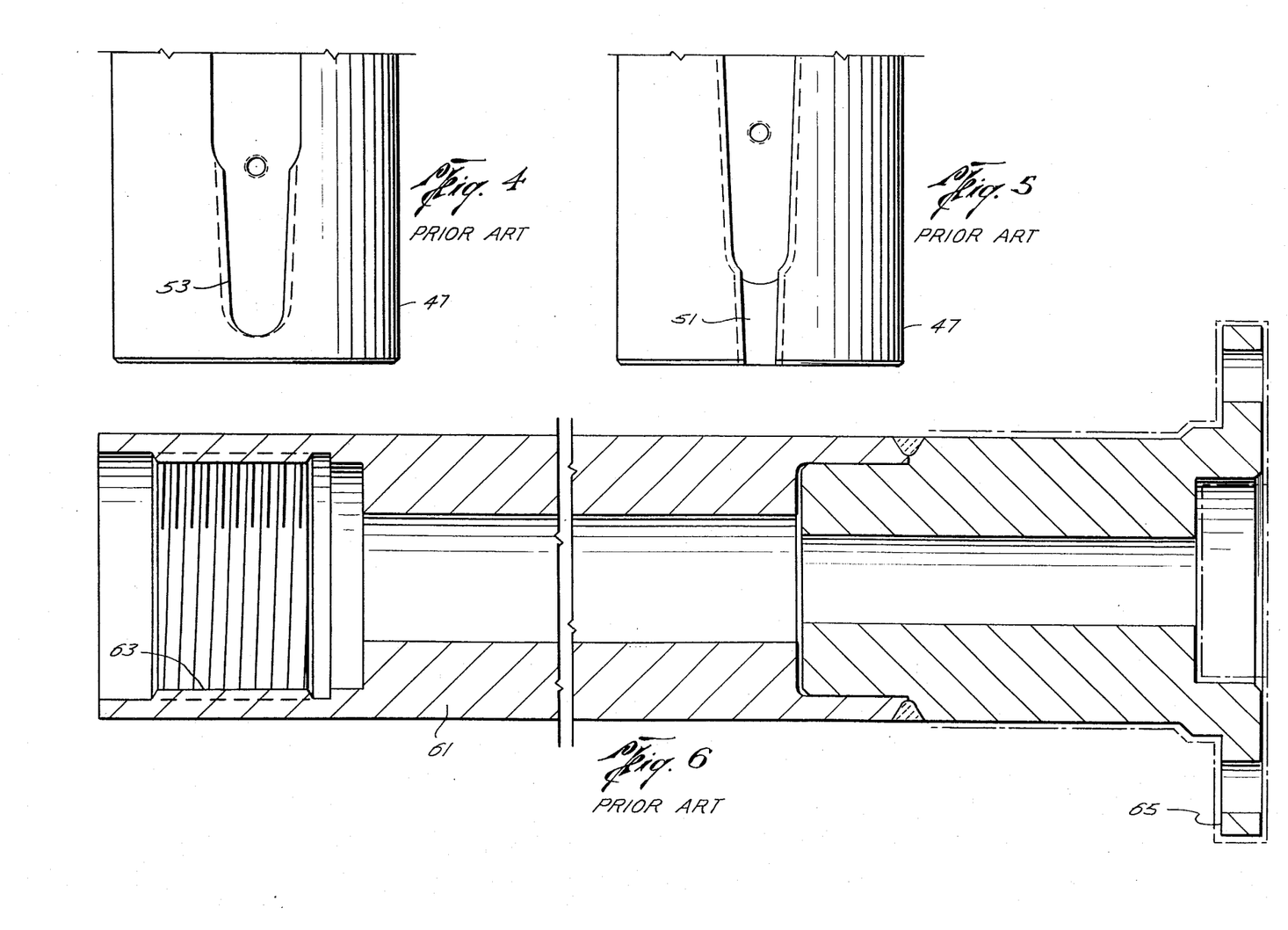
FIGS. 4 and 5 are views taken in the directions indicated in FIG. 2.
FIG. 6 is an axial section through a prior art boring bar.

Referring also to FIGS. 4 ad 5, end 47 of the grooving head or cutter mount, opposite from threaded end 33, is provided with four paraxial slots 51, 52, 53, 54 to receive wear pads to centralize the grooving head in the work piece. Referring to FIG. 6, the boring bar employed with cutter mount 31 is a plain tube 61 having no work contacting means on its outer periphery. Tube 61 has a threaded socket 63 at its distal end to receive the cutter mount and a flange 65 at its proximal end for securement to the tail stock of the lathe (not shown). The tail stock holds the cutter rotationally stationary and advances it axially into a tubular work piece held in the lathe chuck and rotated therewith.

DESCRIPTION OF PREFERRED EMBODIMENT OF INVENTION

Figure 7:
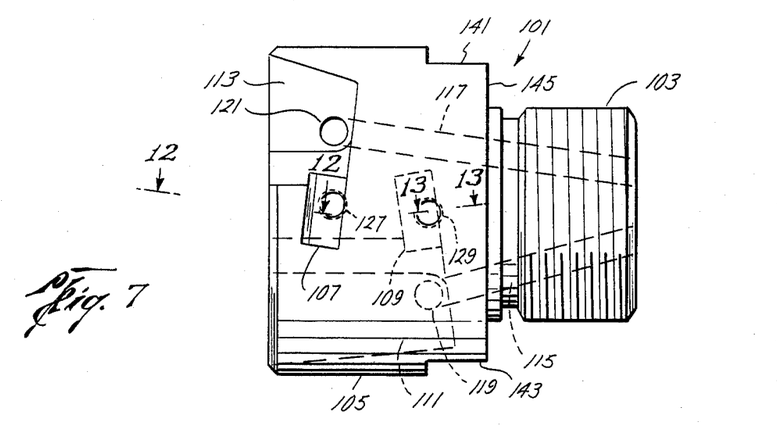
FIG. 7 is a side view of a grooving head or cutter mount in accordance with the invention.
Figure 8:
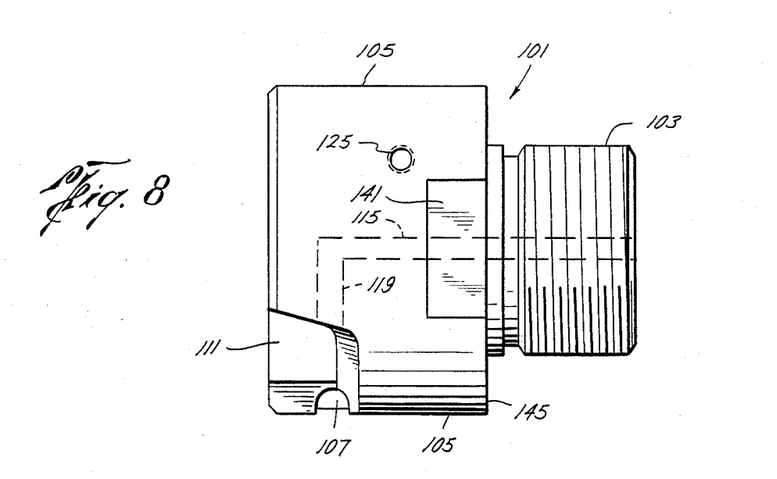
FIGS. 8 and 9 are top and bottom views of the head shown in FIG. 7.
Figure 9:
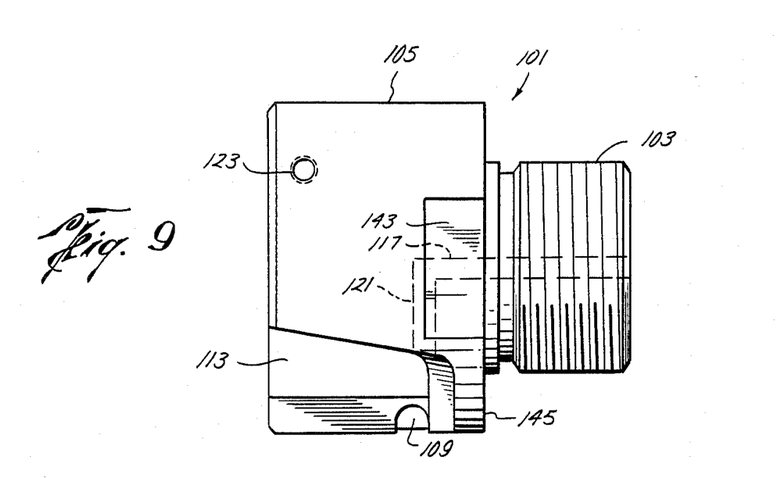
Figure 10:
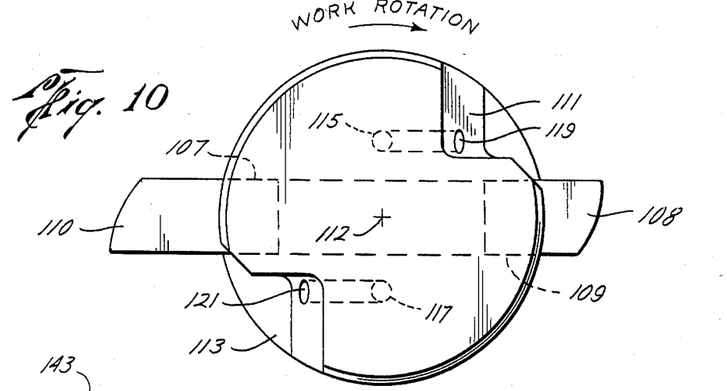
FIGS. 10 and 11 are left and right end views of the head shown in FIG. 7, FIG. 10 further showing two cutters mounted in the head.
Figure 11:
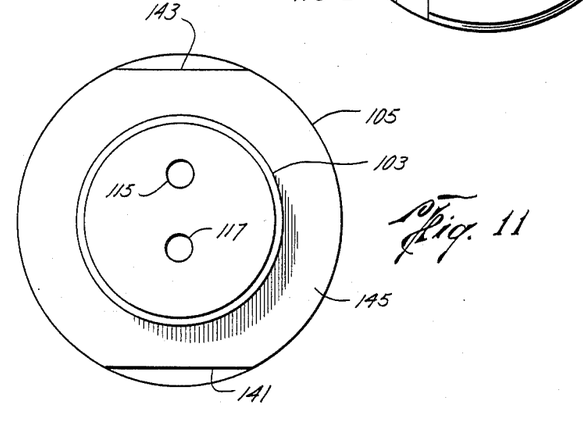
Figure 12:
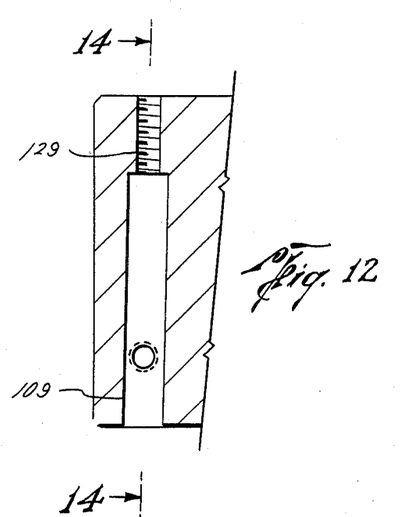
FIGS. 12 and 13 are fragmentary sections taken at plane A—A indicated in FIG. 7.
Figure 13:
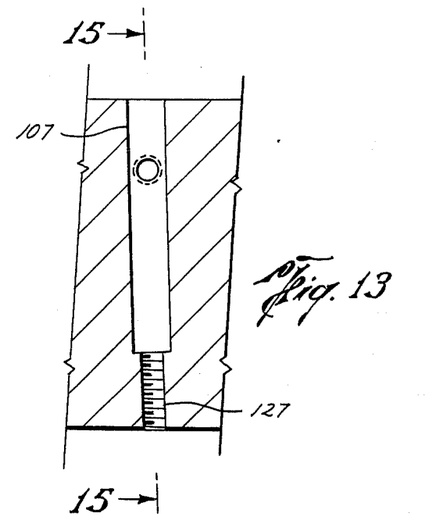

Referring now to FIGS. 7-15 and more particularly to FIG. 7, there is shown a grooving head or cutter mount 101 of generally cylindrical configuration. Proximal end 103 of the head is threaded so that it can be screwed into the distal end of a boring bar. Distal end 105 of the head is provided with two oppositely directed rectangular cross section sockets 107, 109. Each socket is adapted to receive a bit or cutter, e.g. as shown at 108, 110 in FIG. 10. Trailing cutter 110 extends to a greater radial distance from the axis 112 of the head than leading cutter 108. Adjacent the leading edge of the mouth of each socket the distal end of head is provided with a sector shaped recess, as shown at 111, 113.

Coolant fluid passages 115, 117 extend from proximal end 103 of the head to fluid passages 119, 121 in the distal end of the head opening to recesses 111, 113 respectively.

It will be noted that recess 113 adjacent slot 109 for the trailing cutter is of greater axial extent then the axial extent of recess 111 adjacent slot 107 for the leading cutter, since slots 107, 109 are axially spaced apart along the cylinder axis of the head. The axial separation d of the slot centers at their outer extremities or mouths is equal to one-half the lead of the helical groove to be cut, since cutters secured in the slots have their tips disposed one half turn apart about the head axis, i.e. they have an azimuthal, i.e. circumferential, separation of 180 degress.

As noted above, the drawings are to scale and a few dimensions have been specified to indicate the scale. In this respect, referring to FIG. 7, it will be seen that the width of the cutter slots 107, 109, which is their dimension transverse to the helical groove to be cut, is less than the helix lead, and their axial separation center to center is greater than their widths.

It is obvious that more than two slots and cutters could be employed, with the slots and their cutters spaced apart axially and azimuthally to fit the helical groove to be cut. Preferably the plurality of cutters, whether two or more, are equiazimuthally spaced apart about the axis of the head, i.e. the axis of relative rotation of the work piece and cutters, e.g. 180 degrees apart for two cutters, 120 degrees apart for three cutters, 90 degrees apart for four cutters. If the cutters are equiazimuthally spaced apart, their axial separation or spacing would also be equal.

It is also to he noted that if any two cutters are to cut in the same helical groove, the speed of relative axial motion of the head and workpiece (e.g. the tail stock speed) must be related to the speed of relative rotation of the work piece and bits (e.g. the chuck rotation speed) according to the relation $$s = (d)(\text{rpm})(360)/(x)$$

where d is the axial separation of the cutter tip centers (in feet), rpm is the revolutions per minute of the work piece, (relative to the bits), X is the angle in degrees between the tips of the cutters measured about the axis of the head (axis of relative rotation) and s is the relative axial speed in feet per minute (of the work piece and head).

At the side of each slot 107, 109, the head is provided with threaded holes 123, 125, respectively to receive set screws, e.g. screws 122, 124 as shown in FIGS. 14 and 15, for retaining the cutters in the slots.

At the bottom of each slot 107, 109 the head is provided with threaded holes 127, 129, respectively, to receive set screws, e.g. screws 126, 128 as shown in FIGS. 14 and 15, for adjustably limiting the extent to which a bit can be inserted into the slot and thus determining the radial extent of its protrusion from the head, i.e. its radial distance from the axis of the head.

Figure 21:
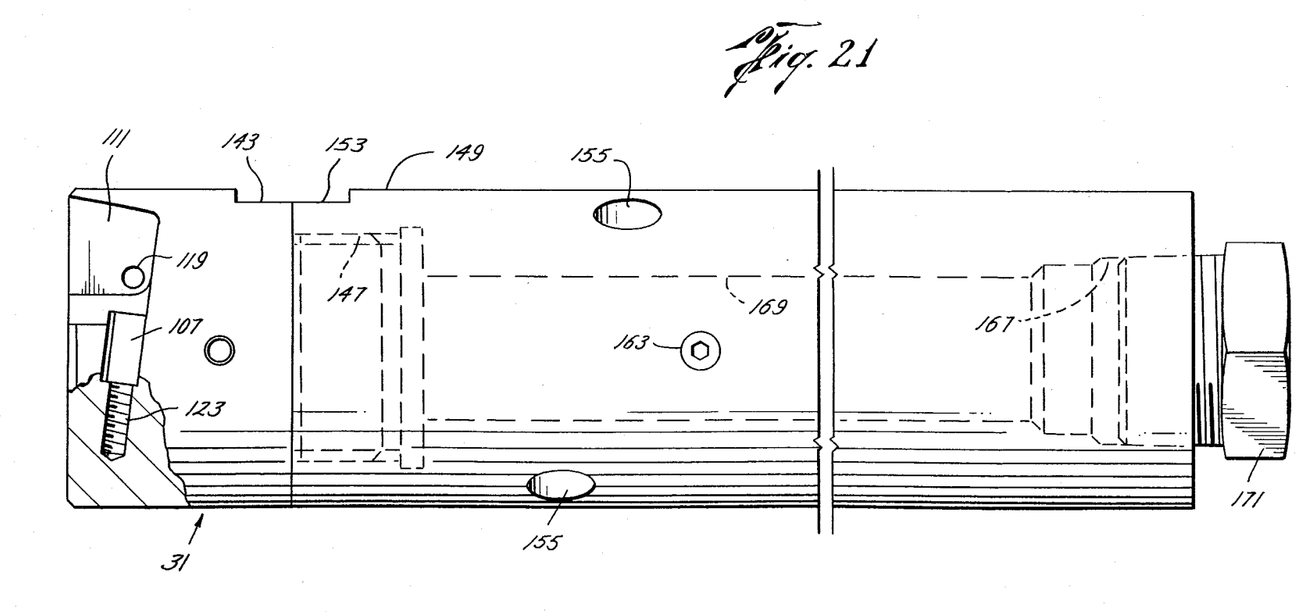
FIG. 21 is an elevation of an assembled boring bar and grooving head in accordance with the invention.

Flat gage surfaces 141, 143 are provided on the distal end of the head. When a gage is screwed tight onto threaded end 103 of the head, abutting against shoulder 145, flat gage surfaces on the gage should be coplanar with surfaces 141, 143 on the head. The gage is of similar configuration to threaded socket 147 in distal end 149 of tubular boring bar 151 (FIG. 16). Therefore, when threaded end of the head is screwed into socket 147, as shown in FIG. 21, gage flat 143 will be coplanar with flat gage surface 153 on the end of the boring bar. Such azimuthal alignment makes it possible accurately to position the cutters azimuthally relative to the work piece merely by accurately positioning the proximal end of the boring bar in the tail stock. In this connection, it is to be noted that when the subject I.D. grooving head is employed to cut an internal helix groove in a work piece that is to become a helical bellows spring as disclosed in the aforementioned Garrett patent, the internal helical groove must be azimuthally oriented relative to the external helical groove if the latter has already been cut or is to be cut simultaneously with the internal groove.

Figure 18:
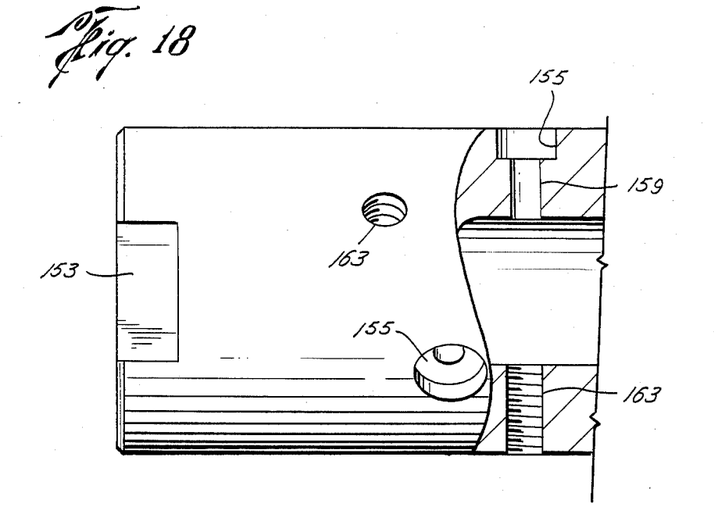
FIG. 18 is a fragmentary top view, partially in section, of the bar shown in FIG. 6.
Figure 19:
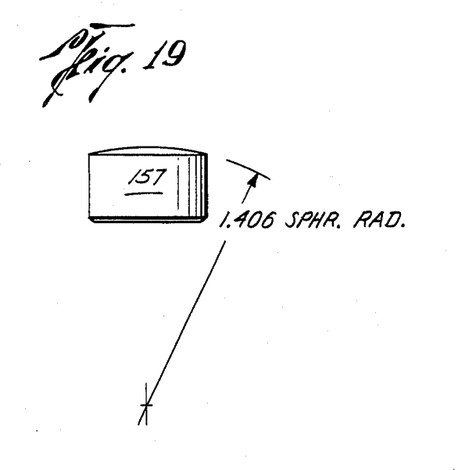
FIG. 19 is an elevation of a wear button employed in the boring bar shown in FIG. 16.
Figure 20:
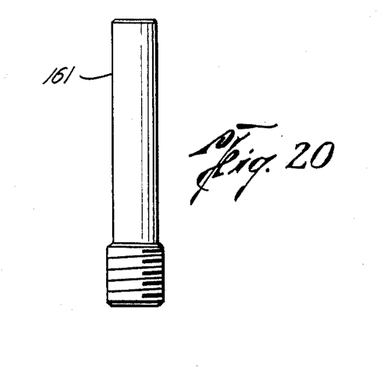
FIG. 20 is an elevation of a button adjusting screw employed in the boring bar shown in FIG. 16.

Referring further to FIG. 16, and to FIG. 18, boring bar 151, adjacent its distal end, is provided with a plurality, e.g. three, equiazimuthally spaced apart pockets 155 each adapted to receive a hard metal wear button such as button 157 shown in FIG. 19. A counter bore 159 in the bottom of each pocket provides access for the end of an adjustment screw 161 (FIG. 20) screwed into a threaded hole 163 diametrically opposite each pocket, whereby the radial protrusion of the wear button can be adjusted. Alternately counterbore 159 can be threaded and receive a short adjustment screw which is positioned by means of a screwdriver or wrench inserted through hole 163 used as an access hole, following which hole 163 is closed with a screw plug so that coolant fluid carried by the boring bar will not leak out. To provide means for connecting a coolant fluid hose to proximal end 165 of the boring bar, it is provided thereat with a threaded socket 167. Fluid can then be conducted through the axial flow passage 169 through the boring bar to flow passages 115, 117 in the head.

A hex headed bushing 171 can be screwed into socket 167, as shown in FIG. 21, to facilitate turning the boring bar to the desired azimuthal position.

In using the grooving head, e.g. to cut an internal helix groove in a vibration damper spring, it is to be understood that a plurality of cutters of different lengths may be successively employed to cut deeper and deeper, longer cutters being substituted for shorter ones as the groove gets deeper and beyond the range of cutter protrusion provided by adjustment screws 126, 128.

The grooving head can be of course be used with advantage in cutting an internal helix groove in any desired work piece, not being limited to use in cutting internal helix grooves in vibration damper springs. The conical wear buttons on the boring bar make only point contact with the work piece, thereby reducing drag, and this construction is of general utility.

While a preferred embodiment of the invention has been shown and described, modifications thereof can be made by one skilled in the art without departing from the spirit of the invention.

I claim:

1. Method of cutting an interior helical groove in a tubular work piece with a helix grooving head,
    said head comprising a body having a distal end and a proximal end, said body being connected at its proximal end to a boring bar adapted to be rotated about an axis, the projection of said axis through said body defining the axis of the body, said body having a plurality of sockets therein each having a cutter, received therein, said cutters having tips protruding from said sockets said sockets being uniformly axially and circumferentially less than 360° spaced apart relative the axis of the body,
    said method comprising rotating the work piece about its tubular axis, introducing said head axially into said tube, and advancing the bar axially at a speed s (feet per minute where $$s = (d)(\text{rpm})(360)/x$$

and d is the axial separation of the cutter tips in feet, rpm is the revolutions per minute of the work piece, and x is the angle in degrees between the tips of the cutters measured about said axis.

2. Method according to claim 1, wherein x=180°.

3. Method according to claim 1 or 2 wherein d is greater than the widths of the cutters.

4. Method according to claim 1, 2 or 3, the widths of the sockets being less than the lead of a single helix coaxial with said body axis and passing through all of said cutter sockets.

* * * * *